(12) United States Patent
Kudelski

(10) Patent No.: US 9,609,280 B2
(45) Date of Patent: Mar. 28, 2017

(54) METHOD FOR CONTROLLING ACCESS TO A PLURALITY OF CHANNELS BY A RECEIVER/DECODER

(75) Inventor: Andre Kudelski, Lutry (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 1497 days.

(21) Appl. No.: 13/042,011

(22) Filed: Mar. 7, 2011

(65) Prior Publication Data

US 2011/0219396 A1 Sep. 8, 2011

(30) Foreign Application Priority Data

Mar. 5, 2010 (EP) .................................. 10155684

(51) Int. Cl.
*H04N 7/167* (2011.01)
*H04N 7/16* (2011.01)
(Continued)

(52) U.S. Cl.
CPC ......... *H04N 7/1675* (2013.01); *H04L 9/0877* (2013.01); *H04N 7/163* (2013.01);
(Continued)

(58) Field of Classification Search
CPC ........... H04N 21/4181; H04N 21/4384; H04N 21/4623; H04N 21/4627; H04N 7/163; H04N 7/1675; H04N 7/167
See application file for complete search history.

(56) References Cited

U.S. PATENT DOCUMENTS 5,301,233 A 4/1994 Coutrot et al.
5,615,265 A * 3/1997 Coutrot ......................... 380/239
(Continued)

FOREIGN PATENT DOCUMENTS

EP 1 051 036 11/2000
EP 1 705 915 9/2006
WO WO 95/20280 7/1995

OTHER PUBLICATIONS

European Search Report issued in EP 10 15 5684, dated Jun. 16, 2010.
(Continued)

*Primary Examiner* — Yassin Alata
(74) *Attorney, Agent, or Firm* — DLA Piper LLP (US)

(57) ABSTRACT

A method for controlling access to a plurality of channels by a unit comprising a security module, each channel being encrypted by a specific control word and having a channel identifier, this method comprising the steps of: tuning to a first channel having first channel identifier and receiving first messages containing a first control word; decrypting the first messages and using the first control word; storing the first control word and the first channel identifier; tuning to a second channel having second channel identifier; calculating the second control word by: calculating a root control word with an inverse cryptographic function $F^{-1}$ using the first control word and the first channel identifier; calculating the second control word with the cryptographic function F using the root control word and the second channel identifier; and using the second control word to access the second channel.

19 Claims, 2 Drawing Sheets

(51) Int. Cl.
 *H04N 21/418*  (2011.01)
 *H04N 21/438*  (2011.01)
 *H04N 21/4623* (2011.01)
 *H04N 21/4627* (2011.01)
 *H04L 9/08*    (2006.01)

(52) U.S. Cl.
 CPC ..... *H04N 21/4181* (2013.01); *H04N 21/4384* (2013.01); *H04N 21/4623* (2013.01); *H04N 21/4627* (2013.01); *H04L 2209/60* (2013.01)

(56) References Cited

U.S. PATENT DOCUMENTS

| | | |
|---|---|---|
| 6,735,313 B1 | 5/2004 | Bleichenbacher et al. |
| 2004/0215691 A1* | 10/2004 | Maria Van De Ven et al. .............. 709/200 |
| 2007/0234395 A1* | 10/2007 | Dureau et al. .............. 725/135 |

OTHER PUBLICATIONS

English language abstract of EP 1 705 915, published Sep. 27, 2006.
Louis C. Guillou et al., "Encipherment and Conditional Access", SMPTE Journal, vol. 103, No. 6, pp. 398-406, Jun. 1994.

\* cited by examiner

METHOD FOR CONTROLLING ACCESS TO A PLURALITY OF CHANNELS BY A RECEIVER/DECODER

CROSS-REFERENCE TO RELATED APPLICATIONS

This application claims priority under 35 U.S.C. §§119 on European Patent Application No 10155684.3 filed on Mar. 5, 2010.

INTRODUCTION

The present invention concerns the field of Pay-TV, in particular to address the problem of the zapping time in Pay-TV system.

BACKGROUND ART

For any conditional access transmission system, the switching time between channels is essentially dependent on the following:
the signal acquisition time, the service channel acquisition time, the service channel conveying all the information on the structure of the multiplex (position of the video component, number and position of the sound components, address of the ECM channel, etc.), the maximum waiting time of an ECM (entitlement message), the processing of the ECM (decryption and check of the rights), the return of the Control Word to the descrambler.

A known solution is described in the document U.S. Pat. No. 5,349,641 in which the ECM of the current channel is sent at a first rate, and the ECMs of the other channels are also embedded into the ECM stream of this channel but with a lower rate.

In the document WO 2009/092016, the solution proposed is to bundle the ECMs of different channels into one ECM and broadcast this bundled ECM into each channel.

This solution has the drawback of unduly loading the channel with additional data not directly useful for this channel.

In the document WO2005/020564, the system described scans the potential additional channels to extract the corresponding control words. Each control word is then stored into a memory and immediately available if the channel is selected by the user.

The drawback of this solution is that a specific tuner has to be designed to scan the other channels in order to collect the other channels' ECMs. This solution is limited to channels within the same band, the tuner being locked to this band to receive the current channel and unable to switch to another band without interrupting the viewing.

The document EP 0 740870 proposes sending a first message common to a plurality of channels from the same operator, this message having a root control word. Each channel has its own messages comprising the access conditions and a diversification value to calculate the channel's control word.

BRIEF DESCRIPTION OF THE INVENTION

The various proposed solutions do not allow a flexible system that is quick without increasing the amount of management data in the stream.

According to the present invention, a method is proposed for controlling access to a plurality of channels by a receiver/decoder comprising a security module, each channel being encrypted by a specific channel control word, each channel having a channel identifier and transporting entitlement messages ECM containing at least the current channel control word and the channel access conditions, this method comprising the steps of:

tuning to a first channel having a first channel identifier, transmitting the first channel identifier to the security module, receiving first entitlement messages ECM1 containing at least a first control word, transmitting the first entitlement messages ECM1 to the security module, decrypting the first entitlement messages ECM1 and verifying the channel access conditions, if the access conditions are met, returning the first control word to the receiver/decoder, storing of the first control word and the first channel identifier by the security module, tuning to a second channel having a second channel identifier and encrypted by a second control word, the first control being the result of a cryptographic function F using the first channel identifier and a root control word, the second control word being the result of the cryptographic function F using the second channel identifier and the root control word, transmitting the second channel identifier to the security module, calculating, by the security module, the second control word by the following steps:

calculating a root control word with an inverse cryptographic function $F^{-1}$ using the first control word and the first channel identifier, calculating the second control word with the cryptographic function F using the root control word and the second channel identifier, returning the second control word to the receiver/decoder.

As it will be apparent, the overall system is slightly modified versus the prior art. The main modification is the structure of the control words for different channels. A root control word is generated usually thanks to a random generator. This root control word is in fact not transmitted as it is the case is the prior art solutions. From this root control word, a dedicated channel control word is generated for each channel.

This generation is based on the use of a cryptographic function F having as parameters the root control word and the channel identifier. The management center in charge of the encryption of the channels generates, for each crypto period, a new root control word and calculates the control word for each channel thanks to the cryptographic function and the channel identifier.

In the same manner, a security module, knowing the cryptographic function and the inverse cryptographic function can calculate the control words for all channels as long as the channel identifier is known.

BRIEF DESCRIPTION OF THE FIGURES

The invention will be better understood thanks to the following detailed description that refers to the enclosed drawings which are given as a non-limitative example, in which:

the FIG. 1 illustrates a user's system, the FIG. 2 illustrates the operations made by the security module.

Figure 3:
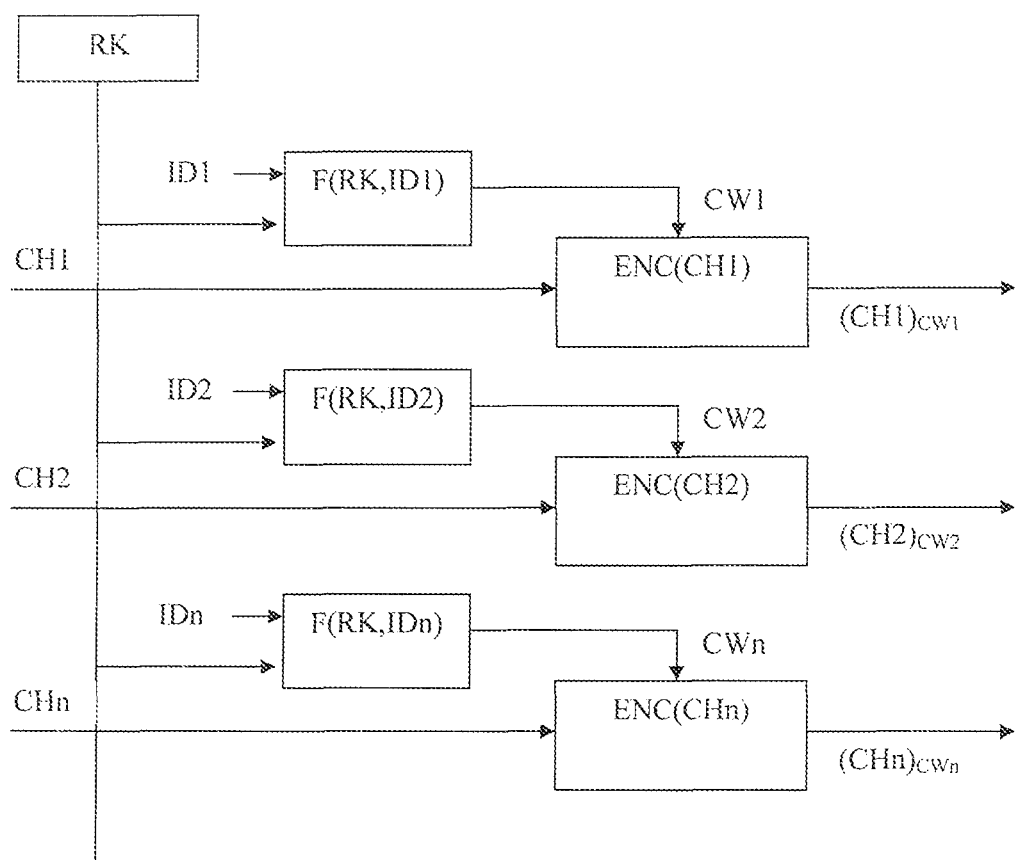

the FIG. 3 illustrates the operations made by the management center.

DETAILED DESCRIPTION

The main interest of the present invention is to speed up the zapping time while the user selects another channel.

The time to display a new Pay-TV channel after a command from the user can be calculated as follows:
- extracting the service descriptor (stream of audio, video, data) from the Program Allocation Table (PAT),
- setting the filter according to the service descriptor,
- extracting the data stream from the set of streams related to this channel,
- waiting for an entitlement message ECM contained in the data stream,
- transferring the entitlement message ECM to the security module,
- processing the entitlement message ECM by the security module, verifying the rights and extracting the control word,
- returning the control word to the receiver/decoder,
- applying the control word to the audio/video data to obtain clear audio/video data,
- waiting for the first complete picture (I frame),
- displaying the incoming group of pictures.

As we can see, the receiver/decoder waits two times, first for receiving the first ECM and secondly for receiving the first I frame.

The Pay-TV system is responsible for the first waiting time and special care is taken to reduce this delay. The first measure is to repeat the ECM in the data stream so as to minimize the time between two ECMs. This time is typically 250 ms i.e. 4 ECMs per second. Increasing the repetition rate will negatively impact the available bandwidth.

Additionally, the processing power of the security module is constantly growing but at the same time, for security reasons, the decryption and verification become more complex. The ECM should not only be decrypted but the access condition (or conditions with some complex queries) needs to be checked against the rights stored in the security module.

With today's technology, the time between the sending of the ECM and the reception of the corresponding control word is about 150 ms. As a consequence, almost half of the switching time is due to the Pay-TV procedure.

Security modules, as mentioned above, can be implemented in a variety of manners such as on a microprocessor card, on a smartcard or any electronic module in the form of a badge or key. These modules are generally portable and detachable from the receiver/decoder and are designed to be tamper-proof. The most commonly used form has electrical contacts but contactless versions of type ISO 14443 also exist. Another implementation of the security module exists where it is directly soldered inside the receiver/decoder, a variation of this being a circuit on a socket or connector such as a SIM module. Yet another implementation is to have the security module integrated on a chip which has another function e.g. on the de-scrambling module or on the microprocessor module of the receiver/decoder. The security module can also be implemented in software.

Figure 1:
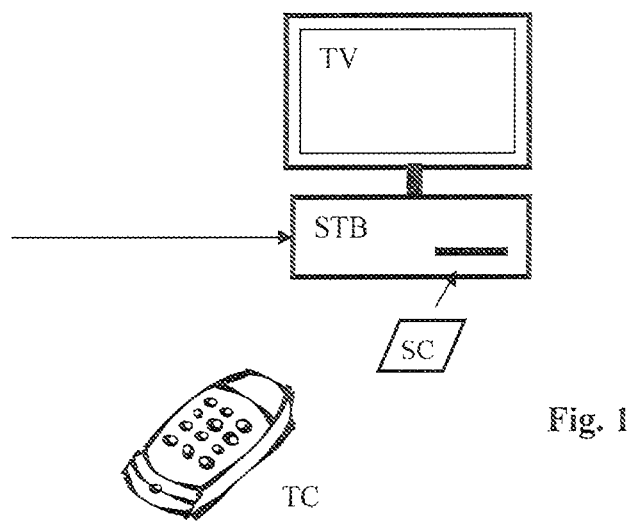

The FIG. 1 illustrates the receiver/decoder STB connected to the television set TV. In this example, the security module SC is detachable and inserted into an appropriate slot of the receiver/decoder. A remote control TC allows the user to pass commands such as selecting a channel.

As explained above, the security module receives the information of the channel identifier. This identifier is contained in the PAT (Program Application. Table) which comprises the description of all streams available from the current tuned band. The middleware of the STB is in charge of processing this table when the user selects another channel. For a given user, the channel 1 is the first channel in its own list of channels. However, this channel has another identifier which is given by the broadcaster. For example, the channel 1 of the user corresponds to the channel 27, the channel 2 of the user corresponds to the channel 12 of the broadcaster. This channel identifier is contained in the PAT.

In DVB, a channel is identified by the DVB triplet. This triplet comprises three fields namely ONID/TSID/SID. ONID=Original Network Identifier, TSID=Transport Stream Identifier, and SID=Service Identifier. The term "channel identifier" can comprise a simple identifier such as 27, the DVB Triplet or an hash value or any known function of the triplet.

This information is passed to the security module as soon as the STB receives a channel change request. This information is directly available to the STB since is it stored into the memory in the channel map. Each user channel identifier has a corresponding broadcaster channel identifier. In the example below, we will consider that the user switches from the user channel 1 to the user channel 2, corresponding to switching from the broadcaster channel 27 to the broadcaster channel 12.

According to the invention, the security module stores the latest control words returned to the STB corresponding to the channel 27. The control words are the current control word and the next control word. Those control words have been extracted from management messages while the STB was tuned to the channel 27.

According to our example, the security module receives the information that the new channel is the channel 12.

Figure 2:
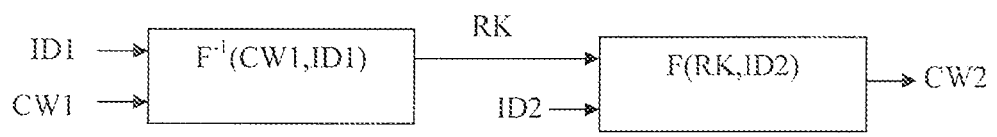

The FIG. 2 illustrates the processing in order to obtain the control words for the channel 12. The ID1 in this example is 27 and the ID2 is 12. The control word of the channel 27 (CW1) is passed to a first cryptographic function having as parameter the channel identifier 27 (ID1). The result of this function is an intermediate result which is called root control word or root key (RK).

In order to obtain the control word (CW2) of the channel 12, a second cryptographic function is applied having the root key (RK) and the channel identifier 12 (ID2) as parameters. The result is the control word (CW2) for the channel 12.

The first cryptographic function is the inverse of the second cryptographic function. These cryptographic functions are encryption (respectively decryption) algorithms such as IDEA, DES, AES.

It is worth nothing that, according to an embodiment of the invention, not only the current control word is calculated using the method explained above, but the next control word, valid for the next crypto period, which was received in the entitlement message while it was tuned to the channel 27, is also processed and calculated.

According to a first embodiment, the control words are simply returned to the receiver/decoder and used to access the encrypted channel 12.

In a Pay-TV approach, the access control is highly recommended. Different solutions can be implemented to conciliate quick zapping and access control.

The first solution is called auto learning. The security module stores in its memory a list containing, for each entry, the channel identifier and a control value.

According to a first embodiment, the control value is a counter. By default, the counter is zero. When the security module receives an ECM and successfully returns the control word, it means that the current channel is allowed. In this case, the list is updated with the channel identifier and a predefined reload counter value, e.g. 10.

When the user returns to this channel, the security module verifies that the channel identifier received from the STB is present in the list and the counter is >0. In this case, the new control word is calculated, returned to the STB and the counter is decremented.

The predefined reload counter value defines the number of control words returned to the STB without rights verification.

This value can be predefined in the security module, so that the speeded-up process is immediately available. In the case that the default value is >0, the security module can immediately turn on the mechanism to calculate the new channel control words, having the consequence that the control word can be returned to the STB even if the user is not authorised to this channel. In this case, this default value will be a small value such as 5 to 10.

The default value and the reload counter value could be different. The default value does not take into account the access conditions and will either set to zero (no provisional access to the channel if the user is not entitled) to a small number e.g. 10 (for temporary access).

When the first ECM is found in the data stream and passed to the security module, the processing of the ECM, verification of the access conditions is carried out and if access conditions are met, the control word is returned to the STB. At the same time, the counter is set to the predefined reload counter value.

If the access conditions are not met, the counter is reset so that no further calculated control word will be returned.

The predefined reload counter value can be preset in the security module or extracted from the ECM it self.

In the same manner, the control value attached to a channel identifier can be a time limit. The ECM comprises a current time and at each successful verification of the access conditions of this channel (through its ECM) the time limit of said channel is updated with the current time plus an authorization period such as a day or a week. In this later example it is necessary to access the given channel long enough to receive an ECM once a week to keep the system always on.

According to another embodiment, the list of the security module is populated with management data received from the management center. EMM (Entitlement Management Message) are used to load rights into the security module, these rights then being compared with the access conditions contained in the ECM.

EMMs can be used to load the table with, for each entry, the channel identifier and a control value. As explained before, this control value can be a counter value that is decremented each time a control word is returned in connection with this channel identifier.

This control value can be a time during which the security module is allowed to return control words for this channel. This time is loaded by extracting this information from an EMM message and will be preferably in line with the subscription period for this channel.

The information of the time is given by the ECM or EMM. Each message contains a time indication that is stored in the security module. The latest time information updates the former one. This time information is compared with the time information attached to the channel identifier to decide if the control word can be returned to the STB. Once the subscription to a given channel has expired, the time information corresponding to this channel (or these channels, since a subscription could cover more than one channel) is not updated and the security module will stop returning calculated control words.

In the case that the user switches from the channel 1 (CHID=27) to 2 (CHID=12) and then 3 (CHID=34), the following operations will be carried out:

the security module reads the last control word used, and with the channel identifier of the channel 1 calculates the root key, the security module receives the channel identifier of the channel 2 and calculates the control words (current and next) thanks to the root key and the channel identifier of the channel 2, in a further switch to channel 3, the root key can still be used for the calculation of the control word for the channel 3.

One can imagine that instead of storing the control words of the current channel for a possible channel change, the security module can directly calculate the root key with the above described function and store only the root keys (odd and even root key). It is not necessary to store the current control words into the security module, the storage of the root keys will be sufficient. In this latter case, it is also not necessary to store the channel identifier of the current channel.

It is to be noted that generally two control words are generated, the current and the next control words. Once the current root key is calculated by the current control word of the channel 1 and the channel identifier, another next root key is calculated using the next control word of the channel 1 and the channel identifier. These root keys are then stored in the security module in case another switch instruction is given by the user.

The cryptographic function F is similar to an encryption or decryption function, the root key being the data to be encrypted (or decrypted) and the channel identifier playing the role of the key. Since the key normally has high entropy, which is not the case with the channel identifier, a diversification function is previously applied on the channel identifier before it is used as a key.

According to a first embodiment, this diversification function can mix the channel identifier with predefined values, known, by the security module and the management enter. This can be done by an encryption function with a key known by the management center and the security module. According to another embodiment, the diversification function uses diversification values contained in ECM. This diversification is therefore not accessible to a third party without being able to successfully decrypt the ECM. This diversification value should be common to all ECM across the various channels at a given time. An example of such diversification value could be the current time. This current time is extracted from the latest decrypted ECM, the ECM that has produced the reference control word, in our example above, the control words of the channel 1.

The time contained in the ECM is known by the management center (since it is generated by it) and by the security module while processing the ECM and extracting the reference control word.

This time data can be used for the diversification function together with the channel identifier.

One of the main advantage of the present invention is the compatibility on the receiver side with existing solutions. The receivers without the feature of the invention can still continue to work since the ECM of each channel contains the control words. An old security module will continue to receive the ECM and will return the control words, a new security module can calculate the new control words before having received the ECM of the new channel.

The cryptographic function F and $F^{-1}$ can be implemented in software into the security module. However, in another embodiment, this function is hardwired so that the algorithm is kept secret.

The invention claimed is:

1. A method for controlling access to a plurality of channels by a receiver/decoder comprising a security module, each channel being encrypted by a specific channel control word, each channel having a channel identifier and transporting entitlement messages containing at least the current channel control word and the channel access conditions, this method comprising the steps of:
   tuning to a first channel having a first channel identifier by the receiver/decoder;
   transmitting the first channel identifier to the security module by the receiver/decoder;
   receiving first entitlement messages containing at least a first control word by the receiver/decoder;
   transmitting the first entitlement messages to the security module by the receiver/decoder;
   decrypting the first entitlement messages and verifying the channel access conditions by the security module;
   if the access conditions are met, returning the first control word to the receiver/decoder by the security module;
   storing of the first control word and the first channel identifier by the security module;
   tuning to a second channel having a second channel identifier and encrypted by a second control word by the receiver/decoder, the first control word being the result of a cryptographic function using the first channel identifier and a root control word, the second control word being the result of the cryptographic function using the second channel identifier and the root control word;
   transmitting the second channel identifier to the security module by the receiver/decoder;
   calculating, by the security module, the second control word by the following steps:
      calculating the root control word with an inverse cryptographic function using the first control word and the first channel identifier;
      calculating the second control word with the cryptographic function using the root control word and the second channel identifier; and
      returning the second control word to the receiver/decoder,
   wherein the root control word is not received by the receiver/decoder.

2. The method of claim 1, wherein the security module comprises a list, each entry of the list comprising at least a channel identifier and a control value, the method further comprising the steps of:
   before returning the second control word, verifying that the control value corresponding to the second channel identifier authorizes the access to the second channel; and
   returning the second control word only if the access is authorized.

3. The method of claim 2, wherein the control value is a counter, the verification of the control value comprising the verification that the counter is positive and said counter being decremented while the second control word is returned to the receiver/decoder.

4. The method of claim 3, further comprising the steps of:
   receiving a second entitlement message containing at least the second control word by the receiver/decoder;
   transmitting the second entitlement messages to the security module by the receiver/decoder;
   decrypting the second entitlement messages and verifying the channel access conditions by the security module;
   if the access conditions are met, returning the second control word to the receiver/decoder by the security module; and
   setting the counter of the second channel to a positive value by the security module.

5. The method of the claim 1, further comprising the steps of:
   diversifying the first channel identifier with a diversification value before applying the inverse cryptographic function; and
   diversifying the second channel identifier with the diversification value before applying the cryptographic function.

6. The method of claim 5, characterized in that the diversification value is extracted from the first entitlement message.

7. A method for controlling access to a plurality of channels by a receiver/decoder comprising a security module, each channel being encrypted by a specific channel control word, each channel having a channel identifier and transporting entitlement messages containing at least the current channel control word and the channel access conditions, this method comprising the steps of:
   tuning to a first channel having a first channel identifier by the receiver/decoder;
   transmitting the first channel identifier to the security module by the receiver/decoder;
   receiving first entitlement messages containing at least a first control word by the receiver/decoder;
   transmitting the first entitlement messages to the security module by the receiver/decoder;
   decrypting the first entitlement messages and verifying the channel access conditions by the security module;
   if the access conditions are met, returning the first control word to the receiver/decoder by the security module;
   calculating a root control word with an inverse cryptographic function using the first control word and the first channel identifier by the security module;
   storing the root control word by the security module;
   tuning to a second channel having a second channel identifier and encrypted by a second control word by the receiver/decoder, the first control word being the result of a cryptographic function using the first channel identifier and the root control word, the second control word being the result of the cryptographic function using the second channel identifier and the root control word;
   transmitting the second channel identifier to the security module by the receiver/decoder;
   calculating, by the security module, the second control word with the cryptographic function using the root control word and the second channel identifier; and
   returning the second control word to the receiver/decoder by the security module, wherein the root control word is not received by the receiver/decoder.

8. The method of claim 7, wherein the security module comprises a list, each entry of the list comprising at least a channel identifier and a control value, the method further comprising the steps of:
before returning the second control word, verifying that the control value corresponding to the second channel identifier authorizes the access to the second channel; and
returning the second control word only if the access is authorized.

9. The method of claim 8, wherein the control value is a counter, the verification of the control value comprising the verification that the counter is positive and said counter being decremented while the second control word is returned to the receiver/decoder.

10. A method for controlling access to a plurality of channels by a security module, the method comprising the steps of:
receiving a channel identifier for a first channel and a control word for a first channel from a receiver/decoder;
decrypting the encrypted control word for the first channel;
transmitting the control word for the first channel to the receiver/decoder;
calculating a root control word using an inverse cryptographic function, the decrypted control word from the first channel and the identifier for the first control channel;
receiving a second channel identifier from the receiver/decoder;
calculating a second control word using the second channel identifier, a cryptographic function inversely related to the inverse cryptographic function, and the root control word;
transmitting the second control word to the receiver/decoder,
wherein the root control word is not received by the receiver/decoder.

11. The method of claim 10, wherein the security module comprises a list, each entry of the list comprising at least a channel identifier and a control value, the method further comprising the steps of:
before returning the second control word, verifying that the control value corresponding to the second channel identifier authorizes access to the second channel; and
returning the second control word only if access is authorized.

12. The method of claim 11, wherein the control value is a counter, and wherein the verifying step comprises verifying that the counter is positive and said counter being decremented while the second control word is returned to the receiver/decoder.

13. The method of claim 12, further comprising:
receiving and decrypting a second entitlement message;
verifying channel access conditions;
if the access conditions are met, returning the second control word to the receiver/decoder; and
setting the counter of the second channel to a positive value.

14. The method of the claim 10, further comprising the steps of:
diversifying the first channel identifier with a diversification value before applying the inverse cryptographic function; and
diversifying the second channel identifier with the diversification value before applying the cryptographic function.

15. A security module comprising:
a processor; and
a memory connected to the processor;
wherein the processor is configured to perform the steps of claim 10.

16. The security module of claim 15, wherein the processor maintains a list, each entry of the list comprising at least a channel identifier and a control value, the processor being further configured to perform the steps of:
before returning the second control word, verifying that the control value corresponding to the second channel identifier authorizes access to the second channel; and
returning the second control word only if access is authorized.

17. The security module of claim 16, wherein the control value is a counter, and wherein the verifying step comprises verifying that the counter is positive and said counter being decremented while the second control word is returned to the receiver/decoder.

18. The security module of claim 17, wherein the processor is further configured to perform the steps of:
receiving and decrypting a second entitlement message;
verifying channel access conditions;
if the access conditions are met, returning the second control word to the receiver/decoder; and
setting the counter of the second channel to a positive value.

19. The security module of the claim 15, wherein the processor is further configured to perform the steps of:
diversifying the first channel identifier with a diversification value before applying the inverse cryptographic function; and
diversifying the second channel identifier with the diversification value before applying the cryptographic function.

* * * * *